United States Patent

[11] 3,625,854

| [72] | Inventors | Bob G. Gower |
| | | Park Forest; |
| | | Hector J. Gonzalez, Hazel Crest, both of Ill. |
| [21] | Appl. No. | 728,323 |
| [22] | Filed | May 10, 1968 |
| [45] | Patented | Dec. 7, 1971 |
| [73] | Assignee | Sinclair Research, Inc. |
| | | New York, N.Y. |

[54] OVEN-CLEANING COMPOSITION
6 Claims, No Drawings

[52] U.S. Cl. .................................................. 252/171,
134/40, 252/155, 252/160
[51] Int. Cl. .................................................. C09d 9/04,
C11d 7/50, C23g 5/02
[50] Field of Search .................................... 252/170,
171, 160, 156, 155, DIG. 2, 8.5; 134/40, 22;
260/78.5 E

[56] References Cited
UNITED STATES PATENTS

| 2,718,497 | 9/1955 | Oldham et al. ............... | 252/8.5 |
| 3,332,872 | 7/1967 | Oakes............................ | 252/8.5 |
| 3,079,284 | 2/1963 | Boucher et al................ | 134/40 |
| 3,085,916 | 4/1963 | Zimmie et al................. | 134/22 |
| 3,301,829 | 1/1967 | Woodward et al............ | 260/78.5 E |

FOREIGN PATENTS

| 751,361 | 1/1967 | Canada ........................ | 252/156 |

OTHER REFERENCES

John– Modern Polishes & Specialties, Chem. Publ. Co., 1947, pg. 288

*Primary Examiner*—Leon D. Rosdol
*Assistant Examiner*—W. Schulz
*Attorney*—McLean, Morton and Boustead

ABSTRACT: An oven-cleaning composition comprising about 2 to 30 weight percent of an alkali metal or ammonium salt of a copolymer of styrene and maleic anyhdride, the copolymer of styrene and maleic anhydride having a molecular weight of about 500 to 50,000 and a molar ratio of styrene to maleic anhydride of about 1:1 to 4:1; about 1 to 10 weight percent of a caustic material which can be an alkali metal oxide or hydroxide, an alkali metal silicate, or an alkanol amine; and about 60 to 97 weight percent water.

OVEN-CLEANING COMPOSITION

This invention relates to an oven-cleaning composition. More particularly, this invention relates to an oven-cleaning composition which contains an alkali metal or ammonium salt of a copolymer of styrene and maleic anhydride reacted with a caustic material such as an alkali metal oxide or hydroxide, an alkali metal silicate, or an alkanol amine.

The market for oven-cleaning compositions is rapidly expanding and much research is being conducted to develop more effective cleaners. Retail sales of such products for 1965 were estimated at $22 million and sales of $50 million are expected by 1970. The market for such products approximately doubled from 1964 to 1965. Oven-cleaning compositions presently marketed are often relatively ineffective or dangerous to use.

Commercial oven-cleaning compositions are generally based on a caustic material such as sodium hydroxide and contain materials such as sodium silicate, nonionic and ionic organic surfactants, polyether glycols, glycols, methylene chloride, ammonia, alkanolamines and similar components. The paste oven-cleaning compositions are usually in a cornstarch carrier and contain as much as 7 to 8 weight percent caustic. Such cleaning compositions are definitely dangerous to use. Aerosol spray cleaning compositions contain less caustic, as low as 2–3 weight percent, but often contain solvents which cause rashes and other skin irritations.

Strong caustic is effective as an oven-cleaning composition because it saponifies the fat in the oven deposits to produce a material which is removable from the oven. Similar effects are observed with silicates, ammonia and amines. Organic surfactants are present primarily as wetting agents and are particularly useful to remove carbon deposits. Polyether glycols, glycols and methylene chloride act in oven-cleaning compositions as solvents and wetting agents.

The primary deposits in ovens are fats which are partially or completely resinified, carbon, proteinaceous materials and carbohydrates. The deposits vary in quantity and tenacity in different areas of the oven. Fats, generally deposited from broiling and roasting, and carbon, generally deposited from spillage, are the most difficult deposits to remove.

It has been found that an alkali metal or ammonium salt of a copolymer styrene-maleic anhydride reacted with a water-soluble caustic material such as an alkali metal oxide or hydroxide, an alkali metal silicate, or an alkanol amine permits the use of reasonably, high, e.g. about 4–10 weight percent, concentrations of caustic material without producing compositions which irritate the skin. In accordance with the present invention, the oven cleaning composition comprises about 2 to 30, preferably about 8 to 25, weight percent of an alkali metal or ammonium salt of a copolymer of styrene and maleic anhydride; about 1 to 10, preferably about 2 to 7, weight percent of a caustic material which can be an alkali metal oxide or hydroxide, an alkali metal silicate, or an alkanol amine; about 60 to 97, preferably about 70 to 90, weight percent water.

The copolymers from which the alkali metal or ammonium salt of the copolymer of styrene and maleic anhydride are prepared can be obtained by any method desired. A preferred method is by solution polymerization where the monomers are polymerized in a suitable solvent employing as the polymerization catalyst a free radical peroxide catalyst, preferably benzoyl peroxide or dicumyl peroxide, at a temperature of about 75° to 300° C. or more. Suitable solvents include the aromatic hydrocarbon solvents which can be either the active aromatic solvents, that is, containing an active hydrogen atom, such as cumene, p-cymene, etc. or the nonactive aromatic solvents such as xylene, toluene, etc. The active aromatic solvents are chain terminating solvents and produce lower molecular weight copolymers than do the nonactive aromatics under similar conditions. Other suitable solvents are the ketones, such as methylethyl ketone which are also active solvents.

The preferred manner of carrying out the polymerization is by what is known in the art as incremental feed addition. By this method the monomers and catalyst are first dissolved in a portion of the solvent in which the polymerization is to be conducted and the resulting solution added in increments to a reactor-containing solvent. The resulting mixture is then heated to reaction temperature which is usually the reflux temperature of the mixture. When an aromatic solvent is employed in the polymerization, the formation of the copolymer causes a heterogenous system, the polymer layer being the heavier layer and recoverable by merely decanting the upper aromatic solvent layer and drying. On the other hand, when a ketone is used as the solvent, the formed copolymer is usually soluble in the solvent media so that recovery of the product by a solvent stripping operation is necessary. Copolymers of styrene and maleic anhydride having a styrene to maleic anhydride molar ratio of about 1:1 to 4:1 and a molecular weight of about 500 to 50,000 can be used and copolymers having a styrene to maleic anhydride molar ratio of about 1:1 to 3:1 and a molecular weight of about 500 to 3,000 are preferred.

The alkali metal or ammonium salt of the copolymer of styrene and maleic anhydride can be prepared by simple hydrolysis of the copolymer with water in the presence of an alkali metal hydroxide or ammonium hydroxide. The hydrolysis can be conveniently carried out by making a slurry in distilled water of at least 2 moles of alkali metal or ammonium hydroxide per mole of the repeating copolymer unit and heating over a water bath until the hydrolysis is complete. It is desirable to use excess alkali metal or ammonium hydroxide, say up to about 10 weight percent or more, over that stoichiometrically required to form the alkali metal or ammonium salt of the copolymer of styrene and maleic anhydride. Any of the alkali metal hydroxides, such as the hydroxides of sodium, potassium and lithium, and ammonium hydroxide can be employed, but sodium hydroxide is preferred.

The caustic material used in the composition can be an alkali metal oxide or hydroxide, such as sodium hydroxide, potassium hydroxide, or lithium hydroxide; an alkali metal silicate, or a water-soluble alkanolamine. The alkali metal silicate can be used either in solid form or as an aqueous solution. Suitable alkali metal silicates include sodium or potassium silicates. The aqueous solution can have a viscosity of about 7 to 70,000 preferably about 60 to 70,000, centipoises at 25° C. and can contain about 5 to 20 weight percent alkali metal oxide and about 15 to 40 weight percent silicon dioxide. The weight ratio of silicon dioxide to alkali metal oxide often is about 1.6:1 to 3.8:1. About 1 to 10, preferably about 2 to 7, weight percent alkali metal silicate is used based upon alkali metal silicate solids. Preferred amines are hydroxyl lower alkyl amines such as, for example, triethanol amines. Glycol amines or capped glycol amines of molecular weights up to about 5,000 are also suitable. The ethanolamines are preferred. The preferred caustic material is sodium hydroxide and any of the above-named caustic materials can be used in place of or in combination with sodium hydroxide.

Solvents such as glycols and polyether glycols may be used in minor amounts in the composition of the invention, e.g. at concentration ranges of about 0.5 to 5 weight percent. Examples the composition glycols and polyether glycols that may be used in the composition of the invention include glycols, such as ethylene glycol, propylene glycol, 1-3 propane-diol, 1,2-butane-diol, 2,3-butane-diol, 1,4-butane-dio, pinacol, etc., and polyether glycols, e.g., polyethylene glycols, of up to about 750 or more molecular weight; and like compounds. Solvents such as methylene chloride may also be used if desired but are not necessary with most oven deposits and are preferably omitted because of their tendency to cause skin irritations.

The oven-cleaning composition may be used either as a paste where it would preferably be thickened with an agent such as cornstarch, or as an aerosol where it would be foamed with typical foaming agents used in aerosol sprays or as a solution in water. The temperature range for use of the composition of the invention can vary from room temperature to about 35° F. Since no harmful gases are evolved upon heating when solvent is not present in the composition, the useful temperature range can be much higher than that for typical commercial oven-cleaning compositions containing solvents. Water in the composition of the invention will evaporate rapidly at high temperature so that only short contact times are necessary above 200° F.

The following examples serve to illustrate the oven-cleaning compositions of the invention:

EXAMPLE I

An aqueous solution of the sodium salt of a copolymer of styrene and maleic anhydride having a molecular weight of about 1,650 and a styrene to maleic anhydride molar ratio of about 2:1 was prepared by the addition of the copolymer of styrene and maleic anhydride to an aqueous solution of sodium hydroxide containing about 5 weight percent excess sodium hydroxide over that stoichiometrically required to form the sodium salt of the copolymer of styrene and maleic anhydride. The resulting aqueous solution contained about 23 weight percent of the sodium salt of the copolymer of styrene and maleic anhydride. To 100 grams of this aqueous solution was added 3 grams sodium hydroxide pellets. The mixture was vigorously stirred and complete solution was obtained in about 20 minutes. The viscosity increased markedly and a high degree of foaming occurred. The foam was stable for 30–40 minutes after stirring was stopped.

This composition was tested on Standard Oven A where oven deposits had accumulated through normal baking and roasting. At room temperature, deposits were easily removed after contact with the cleaner for about 10 minutes. At 200° F., most deposits were removed with only about 1–2 minutes' contact time. At both room temperature and at 200° F., this composition was more effective as an oven cleaner than two commercial oven cleaners marketed in aerosol form.

EXAMPLE II

To 100 grams of the aqueous solution of the sodium salt of the copolymer of styrene and maleic anhydride having a molecular weight of about 1,650 and a styrene to maleic anhydride molar ratio of about 2:1 which was prepared in example I was added a concentrated aqueous solution of sodium hydroxide comprising 3 grams sodium hydroxide dispersed in 1.5 ml. water. The mixture was vigorously stirred but no viscosity increase was observed. The foam which was produced by the reaction was not stable and broke immediately when stirring was ceased. The composition was tested in the same manner as example I on Standard Oven A and was found not to be as effective an oven cleaning composition as the composition prepared in example I.

Comparing the compositions prepared in example I and example II, in example I when sodium hydroxide pellets were added to an aqueous solution of the sodium salt of a copolymer of styrene and maleic anhydride, a marked viscosity increase and considerable foam resulted. In example II, the addition of a concentrated aqueous sodium hydroxide solution to the same aqueous solution of the sodium salt of a copolymer of styrene and maleic anhydride did not produce either the viscosity increase or foam. However, the final concentration of all components in examples I AND II were essentially the same. The composition of example I performed much better as an oven-cleaning composition and, therefore, is the preferred composition.

EXAMPLE III

An aqueous solution of the ammonium salt of a copolymer of styrene and maleic anhydride was prepared by the addition of a copolymer of styrene and maleic anhydride having a molecular weight of about 1,650 and a styrene to maleic anhydride molar ratio of about 2:1 to an aqueous solution of ammonia containing about 10 weight percent excess ammonia over that stoichiometrically required to produce the ammonium salt of the copolymer of styrene and maleic anhydride. The resulting aqueous solution contained about 23 weight percent of the ammonium salt of the copolymer of styrene and maleic anhydride. 8 grams of an aqueous solution of sodium silicate having a viscosity of about 100 centipoises at 25° C. and containing about 8.6 weight percent $Na_2O$, about 27.7 weight percent $SiO_2$ and having a $SiO_2$ to $Na_2O$ ratio of about 3.22:1 (marketed by the Philadelphia Quartz Co. as Sodium Silicate E) were added to 100 grams of the above-prepared aqueous soluton and the mixture was vigorously stirred to produce a paste. This oven-cleaning composition was tested on Standard Oven A in the manner described in example I and was found to be more effective both at room temperature and at 200° F. than a commercial oven-cleaning formulation marketed in aerosol form, but this composition was not as effective in oven cleaning as the composition prepared in example I.

EXAMPLE IV

Aqueous solutions of sodium hydroxide containing 4 and 5 weight percent sodium hydroxide were tested on Standard Oven A in the same manner as described in example I. The oven-cleaning properties of these aqueous sodium hydroxide solutions were inferior to the oven-cleaning properties of the composition prepared in example I at both room temperature and at 200° F.

It is claimed:

1. An oven-cleaning composition consisting essentially of about 2 to 30 weight percent of an alkali metal or ammonium salt of a copolymer of styrene and maleic anhydride said copolymer of styrene and maleic anhydride having a molecular weight of about 500 to 50,000 and a molar ratio of styrene to maleic anhydride of about 1:1 to 4:1;

about 1 to 10 weight percent of a water-soluble caustic material selected from the group consisting of alkali metal silicates, lower alkanol amines, glycol amines having a molecular weight up to 5,000 and capped glycol amines having molecular weight up to 5,000, and about 60 to 97 weight percent water.

2. The composition of claim 1 wherein said copolymer of styrene and maleic anhydride has a molecular weight of about 1,650 and a molar ratio of styrene to maleic anhydride of about 2:1.

3. An oven-cleaning composition consisting essentially of:

about 8 to 25 weight percent of an ammonium salt of a copolymer of styrene and maleic anhydride said copolymer of styrene and maleic anhydride having a molecular weight of about 500 to 3,000 and a molar ratio of styrene to maleic anhydride of about 1:1 to 3:1;

about 1 to 10 weight percent based on the sodium silicate solids of an aqueous solution of sodium silicate said solution having a viscosity of about 60 to 70,000 centipoises at 25° C. and containing about 6 to 20 weight percent $Na_2O$, about 15 to 40 weight percent $SiO_2$, and having a weight ratio of $SiO_2$ to $Na_2O$ of about 1.6:1 to 3.8:1.; and about 70 to 90 weight percent water.

4. The composition of claim 3 wherein the aqueous solution of sodium silicate is about 2 to 7 weight percent based on the sodium silicate solids.

5. The composition of claim 1 wherein the alkanol amine is ethanol amine.

6. The composition of claim 1 wherein said copolymer of styrene and maleic anhydride have a molecular weight of about 500 to 3,000 and a molar ratio of styrene to maleic anhydride of about 1:1 to 3:1.

* * * * *